US012284956B2

(12) United States Patent
Mcclellan et al.

(10) Patent No.: US 12,284,956 B2
(45) Date of Patent: *Apr. 29, 2025

(54) STRUCTURES FOR GROWING PLANTS

(71) Applicant: Agriforce Growing Systems Ltd., Vancouver (CA)

(72) Inventors: Troy Mcclellan, Vancouver (CA); Ingo Mueller, Vancouver (CA)

(73) Assignee: Agriforce Growing Systems Ltd., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/404,061

(22) Filed: Jan. 4, 2024

(65) Prior Publication Data

US 2024/0147917 A1    May 9, 2024

Related U.S. Application Data

(63) Continuation of application No. 18/096,417, filed on Jan. 12, 2023, now Pat. No. 11,895,958, which is a continuation of application No. 17/436,275, filed as application No. PCT/CA2020/050302 on Mar. 6, 2020, now Pat. No. 11,582,918.

(60) Provisional application No. 62/815,131, filed on Mar. 7, 2019.

(51) Int. Cl.
| | |
|---|---|
| *A01G 9/14* | (2006.01) |
| *A01G 9/24* | (2006.01) |
| *E04B 1/19* | (2006.01) |
| *E04B 1/24* | (2006.01) |
| *E04B 1/342* | (2006.01) |
| *E04H 5/08* | (2006.01) |

(52) U.S. Cl.
CPC ............. *A01G 9/14* (2013.01); *A01G 9/24* (2013.01); *E04B 1/19* (2013.01); *E04B 1/24* (2013.01); *E04B 1/342* (2013.01); *E04H 5/08* (2013.01)

(58) Field of Classification Search
CPC .... A04G 9/14; A04G 9/24; E04B 1/19; E04B 1/24; E04B 1/342; E04H 5/08
USPC ............................................................. 47/17
See application file for complete search history.

(56) References Cited

U.S. PATENT DOCUMENTS

| | | | |
|---|---|---|---|
| 4,201,019 | A | 5/1980 | Jones |
| 4,671,025 | A | 6/1987 | Butler |
| 4,753,054 | A | 6/1988 | Butler |
| 4,976,086 | A | 12/1990 | Bom |
| 5,655,335 | A | 8/1997 | Vermeer |
| 6,898,902 | B1 | 5/2005 | Stoffers et al. |
| 2005/0252149 | A1 | 11/2005 | Ritchey et al. |

(Continued)

FOREIGN PATENT DOCUMENTS

| | | |
|---|---|---|
| CN | 1985054 A | 6/2007 |
| CN | 202524827 U | 11/2012 |

(Continued)

OTHER PUBLICATIONS

European Patent Office; European Search Report issued in European Application No. 20765629.9, dated Oct. 21, 2022.

(Continued)

*Primary Examiner* — James J Buckle, Jr.

(57) ABSTRACT

A structure for growing plants comprising a main support, vertical supports along the perimeter of the foundation, a perimeter frame connected to the vertical supports, cables connected to the main support, vertical supports and perimeter frame, and an inner and outer shell formed from transmissive panels supported by the cables.

21 Claims, 9 Drawing Sheets

(56) References Cited

U.S. PATENT DOCUMENTS

| | | |
|---|---|---|
| 2007/0193111 A1 | 8/2007 | Van Dijk |
| 2007/0214714 A1 | 9/2007 | Harnois et al. |
| 2009/0071091 A1 | 3/2009 | Ode |
| 2009/0183425 A1 | 7/2009 | Zimhoni et al. |
| 2016/0212945 A1 | 7/2016 | Colless et al. |
| 2017/0223904 A1 | 8/2017 | Raccanello |
| 2018/0209162 A1 | 7/2018 | von Behrens et al. |
| 2018/0238043 A1 | 8/2018 | Kuramoto |
| 2019/0313586 A1 | 10/2019 | Gelder |

FOREIGN PATENT DOCUMENTS

| | | |
|---|---|---|
| CN | 103039302 A | 4/2013 |
| CN | 203482674 U | 3/2014 |
| CN | 103960086 A | 8/2014 |
| CN | 104770244 A | 7/2015 |
| CN | 204466418 U | 7/2015 |
| EP | 0106920 A1 | 5/1984 |
| GB | 821147 A | 9/1959 |
| KR | 20040037855 A | 5/2004 |
| KR | 20070110164 A | 11/2007 |
| KR | 101650927 B1 | 8/2016 |
| WO | 9005220 A1 | 5/1990 |
| WO | 2019124785 A1 | 6/2019 |

OTHER PUBLICATIONS

China National Intellectual Property, First Office Action issued in Chinese Patent Application No. 202080033944.2, dated Nov. 1, 2022.
International Search Report and Written Opinion, International Application No. PCT/CA2020/050302, dated Jun. 1, 2020.

STRUCTURES FOR GROWING PLANTS

CROSS-REFERENCE TO RELATED APPLICATIONS

This application is a continuation of U.S. application Ser. No. 18/096,417 filed Jan. 12, 2023 which is a continuation of U.S. application Ser. No. 17/436,275 filed Sep. 3, 2021 which is a 371 of International Application No. PCT/CA2020/050302 filed Mar. 6, 2020 which claims the benefit of and priority to U.S. Provisional Application No. 62/815,131 filed Mar. 7, 2019 the contents of which are hereby incorporated herein by reference.

TECHNICAL FIELD

The present disclosure relates to structures for growing plants.

BACKGROUND

Existing greenhouses can be useful for growing plants, but can also have various drawbacks. Greenhouses lack insulation, which makes them extremely expensive to heat in cold conditions.

For example, greenhouses use vertical posts and trusses to support the roof system. This can be problematic in that growing operations must be designed around the vertical posts, and the trusses and posts cause shade, which reduces the amount of natural sunlight.

For example, greenhouses use either polyethylene or glass, which do not allow the full light spectrum of natural sunlight to penetrate the greenhouse. As a result, structures that use polyethylene or glass do not allow ultraviolet (UV) light to enhance plant growth.

SUMMARY

Embodiments described herein provide improved structures for growing plants. The improved structures generate micro-environment conditions. An aspect of the present disclosure provides a structure for growing plants comprising: a foundation having a first end closer to the equator and a second end farther from the equator; a main support comprising two vertical members extending upwardly from opposed lateral sides of the foundation and a horizontal member extending laterally across the foundation in an east-west direction between the two vertical members; a plurality of vertical supports extending upwardly from the foundation and spaced around a perimeter of the foundation; a perimeter frame connected to top portions of the vertical support members; an outer shell comprising an outer roof comprising an outer cable net supported by the outer perimeter frame and a plurality of transmissive panels coupled to the outer cable net, and an outer wall on each of the east and west lateral sides and the first end, each outer wall comprising outer wall cables extending vertically to the outer perimeter frame and a plurality of transmissive panels coupled to the outer wall cables; and, an inner shell comprising an inner roof comprising an inner cable net supported by the inner perimeter frame and a plurality of transmissive panels coupled to the inner cable net, and an inner wall on each of the east and west lateral sides and the first end, each inner wall comprising inner wall cables extending vertically to the inner perimeter frame and a plurality of transmissive panels coupled to the inner wall cables.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

The following describes example structures for growing plants.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures and components are not described in detail to avoid obscuring the examples described. The description is not to be considered as limited to the scope of the examples described herein.

Figure 1:
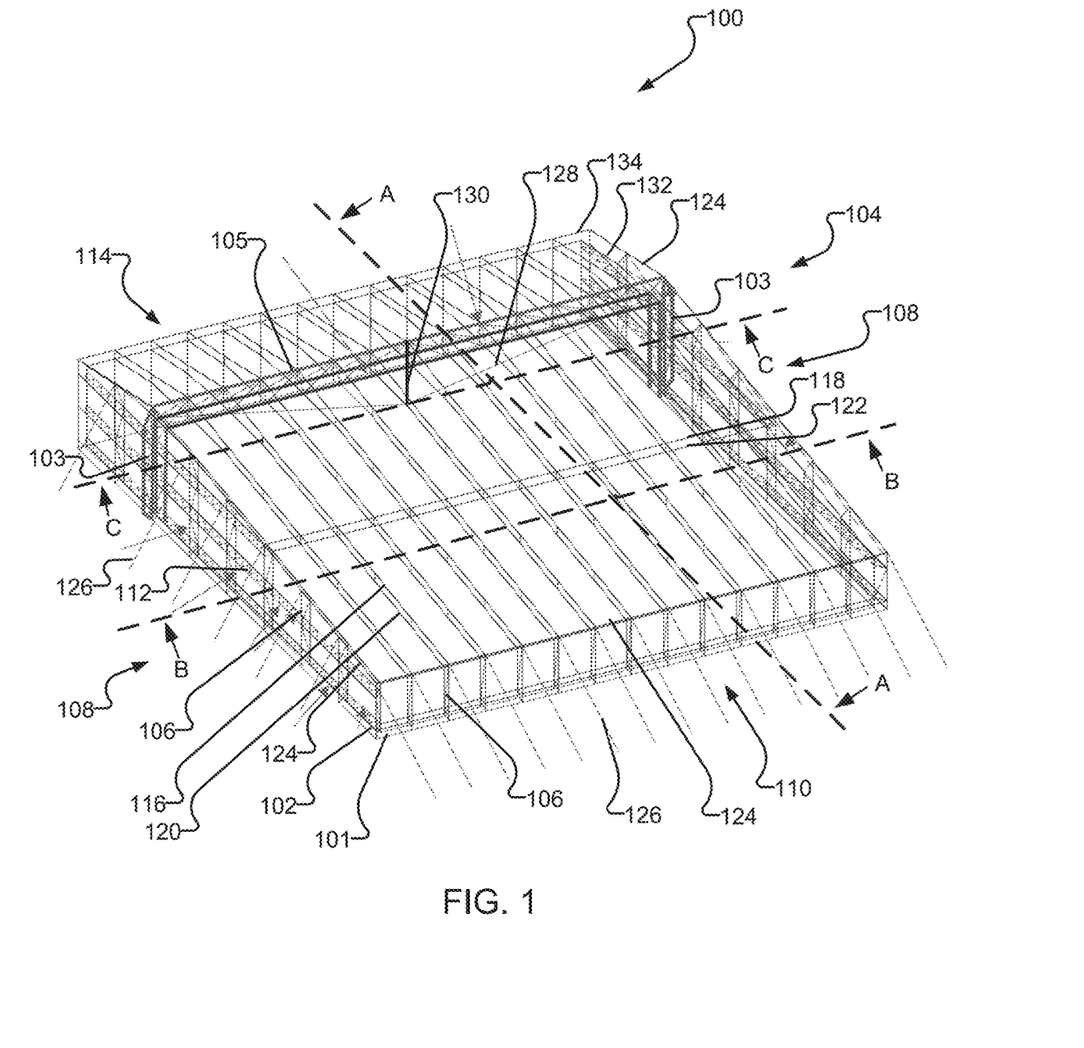
FIG. 1 shows structural elements of an example plant growing structure according to one embodiment of the present disclosure.

FIG. 1 shows an example plant growing structure 100 according to one embodiment of the present disclosure. The structure 100 has a foundation 101 at its base, with a stem wall 102 extending upwardly a short distance (for example about 3 feet) around the perimeter of the foundation 101. The structure has opposed lateral sides. The structure has ends that can be positioned relative to the equator. The structure 100 has a main support 104 with two vertical members 103 on either side of the foundation, extending upwardly from the foundation and a horizontal member 105 extending laterally across the foundation in an east-west direction between the two vertical members 103. The sides of the foundation can be generally positioned east and west so that the horizontal member 105 extends laterally across the foundation in an east-west direction between the two vertical members 103. The two vertical members 103 are on either side of the foundation and so can also be generally positioned east and west. In some embodiments, the foundation can be in a position proximate true north (e.g. within a range of 15 degrees off true north) to retain optimal solar exposure. The horizontal member 105 can connect with top portions of the two vertical members 103 and extend laterally across the foundation. In an example, a height of the structure can be 40' at the ridge of the structure. The vertical members 103 extend upwardly along the opposed later sides of the structure 100.

The main support 104 and two vertical members 103 provide a tri-chord configuration to support the structure 100. The horizontal member 105 can connect with top portions of the two vertical members 103 using connectors. The location of the connections can vary depending on the ridge height of the structure 100.

Figure 8:
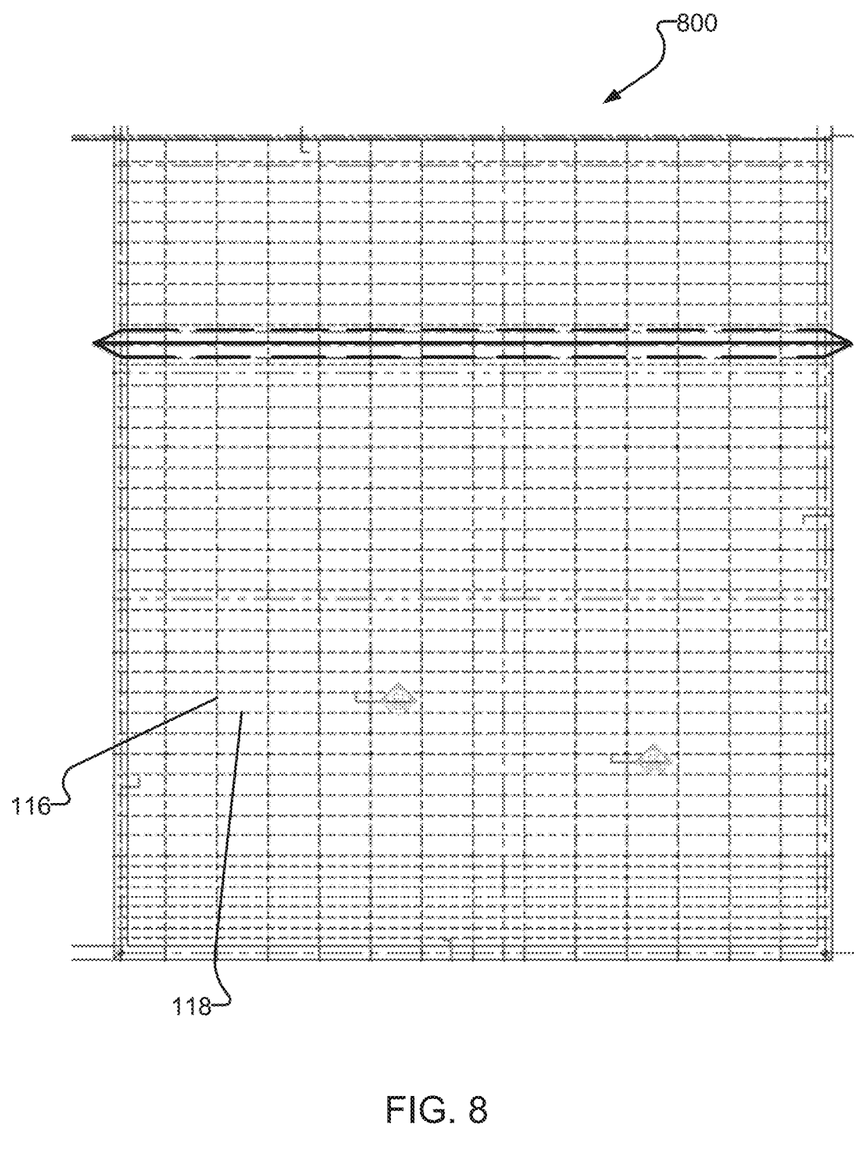
FIG. 8 shows a top plan view of the roof of the structure of FIG. 1.
Figure 12:
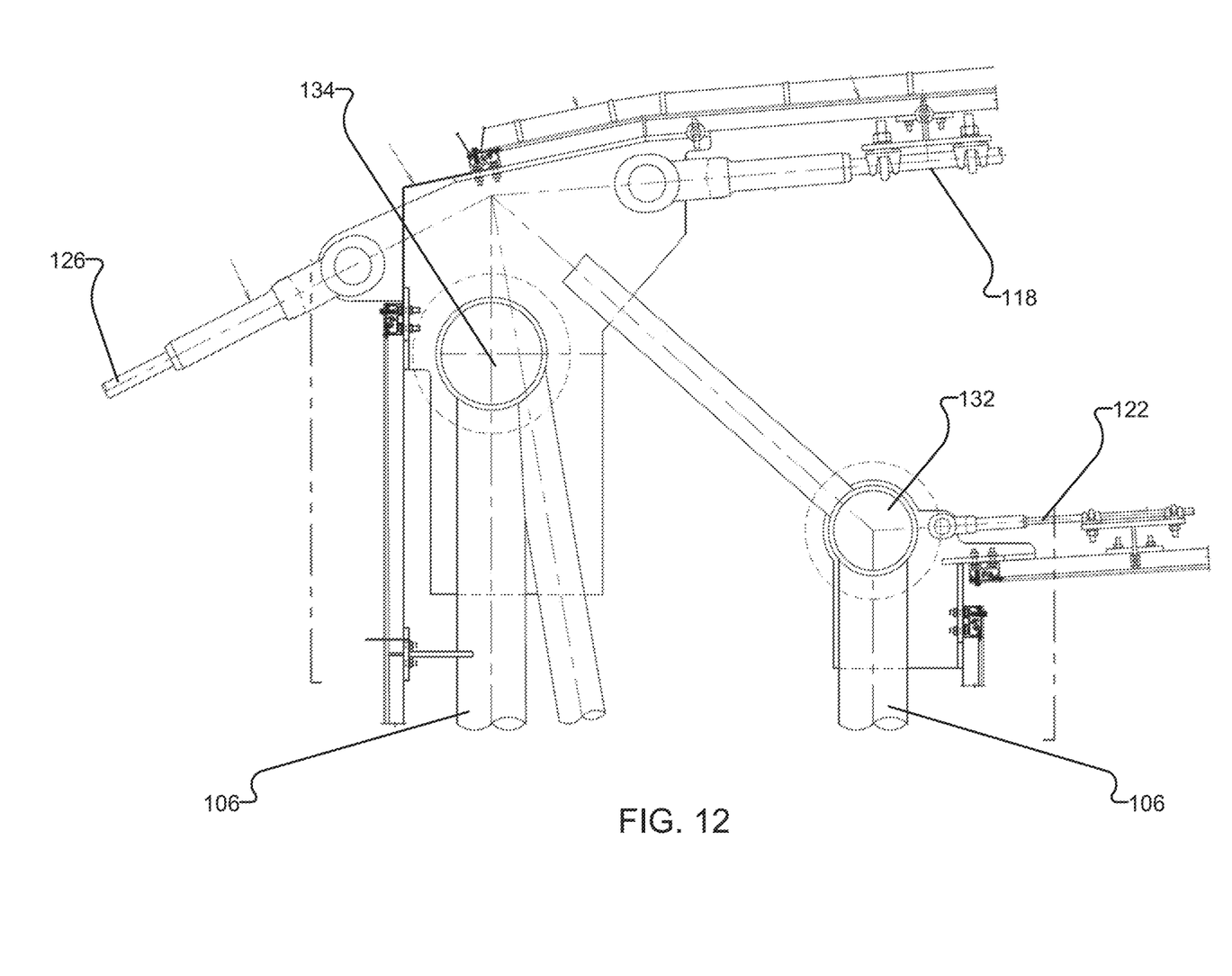
FIG. 12 is a sectional view through the intersection between a vertical support and the perimeter frame of the structure of FIG. 1.

The structure 100 has a plurality of vertical supports 106 extending upwardly from the stem wall 102 along the sides 108 of the structure 100 and along a first end 110 of the structure 100, and a perimeter frame 124 around the upper edges of the structure atop the vertical supports 106. The structure 100 has vertical supports 106 extending upwardly from the stem wall 102 along the sides 108 of the structure 100, and the structure 100 has vertical members 103 that also extend upwardly from the stem wall 102 along the sides 108 of the structure 100. The vertical supports 106 and the vertical members 103 can extend from the same region of the stem wall 102 along the sides 108 of the structure 100. The vertical supports 106 and the vertical members 103 can be implement using metal and cable components, for example, and reside within and provide the envelope or walls of the structure 100. The perimeter frame 124 may have an inner perimeter frame 132 and a larger outer perimeter frame 134 each connected to the vertical supports 106, as shown in FIG. 12. The inner and outer perimeter frames 132 and 134 can be structural steel nodes, for example. The inner and outer perimeter frames 132 and 134 can be at the juncture between the vertical walls and the sloped roof of the structure 100. The inner perimeter frame 132 connects to a vertical support 106 and lower secondary cables 122. The outer perimeter frame 134 connects to a vertical support 106 and upper secondary cables 118. The upper secondary cables 118 form part of an outer cable net 800 (FIG. 8). FIG. 12 shows closure panels that generate an air tight building envelope and sealed air volume or barrier. In this example, tie back cables 126 are attached to the outer perimeter frame 134.

Figure 13:
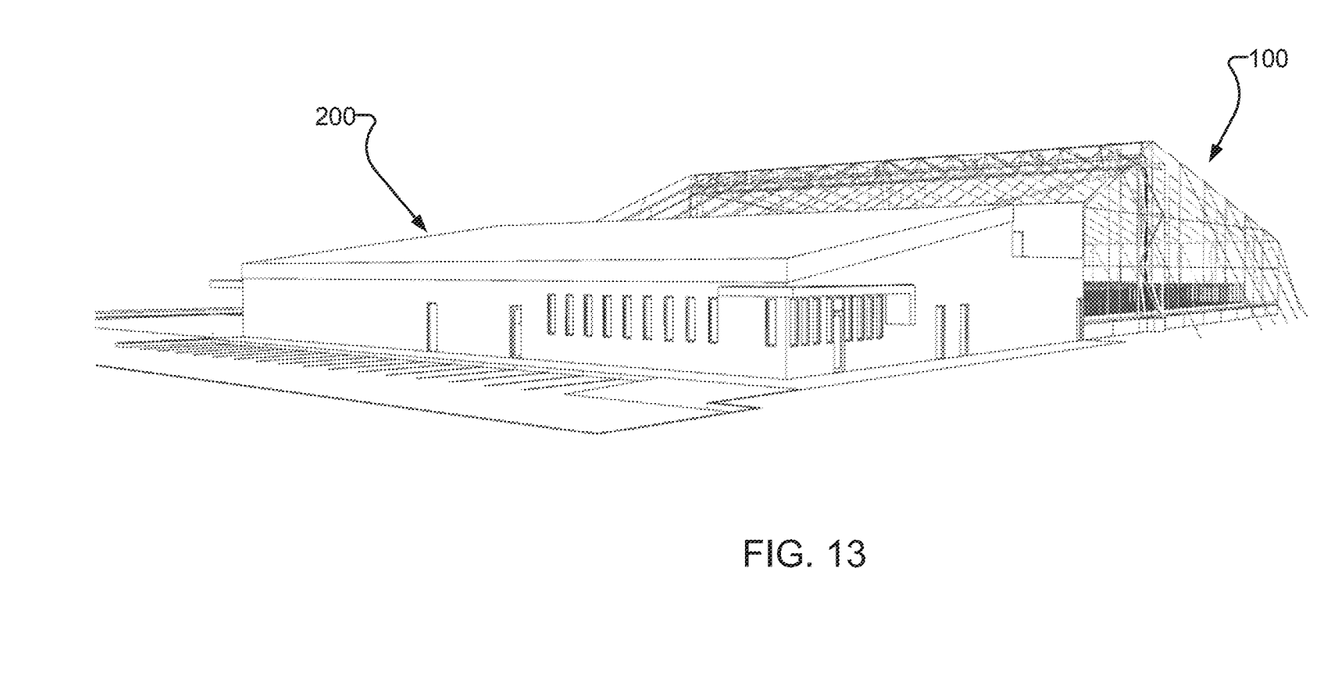
FIG. 13 shows an example plant growing structure adjacent to a headhouse according to one embodiment of the present disclosure.

The support for the structure 100 may further comprise horizontal supports 112 connected between the vertical supports 106 along the lateral sides 108 of the structure 100. A second end 114 of structure 100 may be supported by a building or with additional rigid support. For example, in some embodiments, the second end 114 of the structure 100 may be supported by a wall of a headhouse 200, as shown in FIG. 13. In some embodiments, the structure 100 may further comprise additional support elements. This additional support can be from interior columns, for example.

When the structure 100 is configured for use in the northern hemisphere, the first end 110 is located closer to the equator than the second end 114 (i.e. the first end is on the south and the second end 114 is on the north), so as to maximize the sunlight incident on the growing area within the structure 100. Conversely, the structure 100 may be configured for use in the southern hemisphere such that the first end is north of the second end, so as to maximize the sunlight incident on the growing area.

Figure 2:
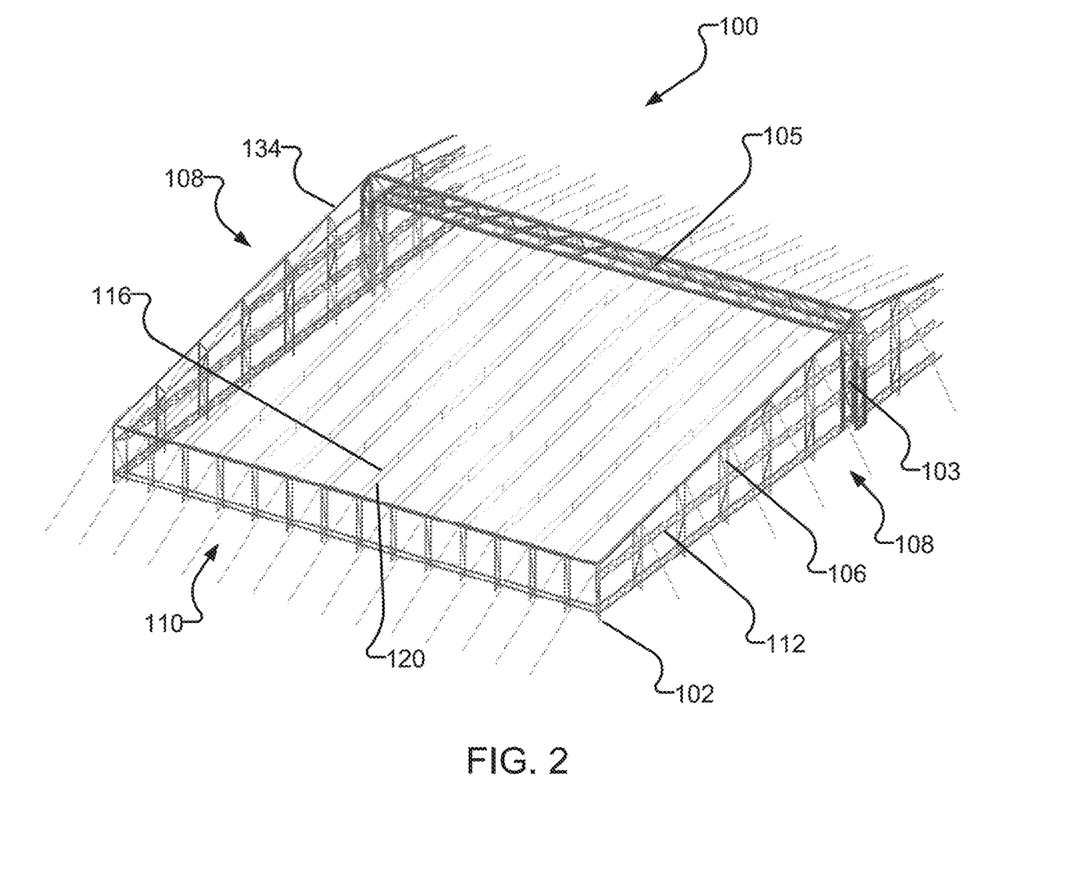
FIG. 2 shows another view of the structure of FIG. 1.

In some embodiments, vertical and horizontal members 103 and 105 of the main support 104 may each comprise a tri-chord truss, with three outer members, as shown in FIGS. 1 and 2. In some embodiments, the vertical supports 106 and horizontal supports 112 may comprise bi-chord trusses, as shown in FIGS. 1 and 2. In some embodiments, the perimeter frame 124 may also be constructed from bi-chord trusses, with the inner and outer perimeter frames 132 and 134 being formed by the two chords of the trusses.

The structure 100 further comprises a roof upper primary cables 116 and lower primary cables 120 running north-south and upper secondary cables 118 and lower secondary cables 122 running east-west. In some embodiments the upper secondary cables 118 and lower secondary cables 122 may be comprised of short lengths of cable, spanning the space between the upper primary cables 116 and lower primary cables 120 rather than long cables, spanning the whole width of the structure 100.

In some embodiments, structure 100 may be further supported by tie back cables 126 attached to the outer perimeter frame 134 and anchored to the ground outside the structure 100. In some embodiments, the tie back cables 126 may each be at an angle of approximately 30 degrees from horizontal.

In some embodiments, the structure 100 further comprises a post 130 (which may be referred to as a "flying mast") extending downwardly from the horizontal member 105 of the main support 104 and held under tension by a cable 128 connected at or near the ends of the horizontal member 105 of the main support 104. The post 130 helps prevent sagging of the horizontal member 105.

Hydraulic and mechanical cable tensioners can used in the installation sequencing to tension the cables. When all cables are tensioned as engineered the cables are stayed by fittings or turnbuckles to fix and retain the proper setting.

The bottoms of the walls are formed by the stem wall 102. In some embodiments, the stem wall 102 incorporates one or more drains for collecting foam residue, as discussed below.

The structure 100 has lateral sides. A lateral side has an outer side and an inner side.

Figure 3:
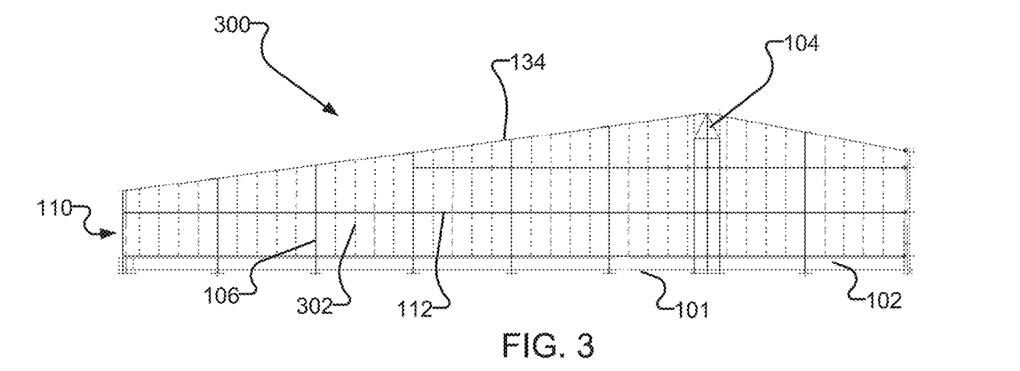
FIG. 3 shows a side view of an outer wall of the structure of FIG. 1.

FIG. 3 shows the outer side 300 of the structure 100 shown in FIG. 1. The outer side 300 further comprises outer wall cables 302 extending vertically downward from the outer perimeter frame 134 to the stem wall 102.

Figure 4:
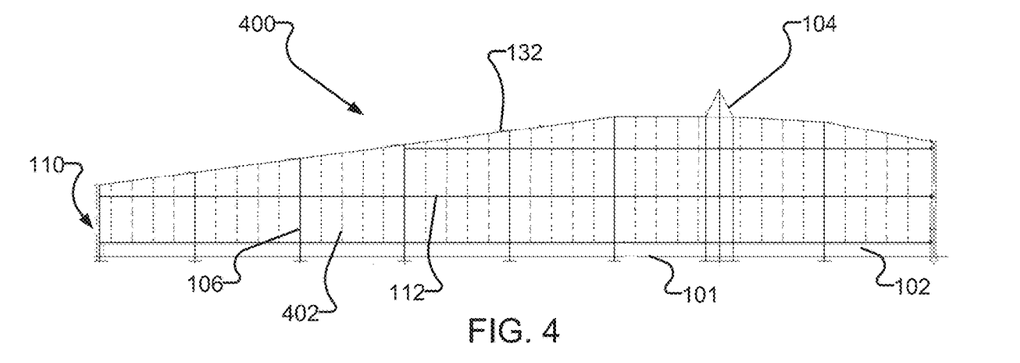
FIG. 4 shows a side view of an inner wall of the structure of FIG. 1.

FIG. 4 shows the inner side 400 of the structure 100 shown in FIG. 1. The inner side 400 further comprises inner wall cables 402 extending vertically downward from the inner perimeter frame 132 to the stem wall 102.

The outer side 300 and the inner side 400 create a sealed air volume or barrier. The outer side 300 has a different height than the inner side 400.

Figure 5:
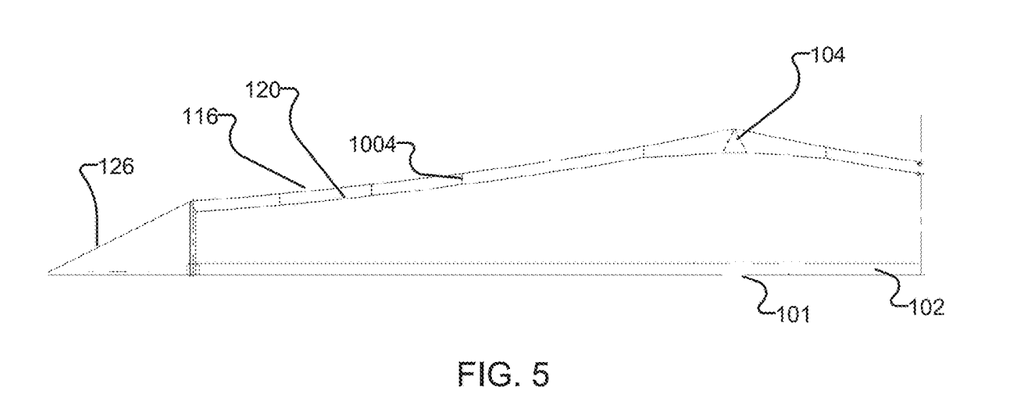
FIG. 5 is a sectional view taken along the line A-A of FIG. 1.

FIG. 5 shows a cross-sectional view of the structure 100 of FIG. 1 taken along the line A-A. As shown, there can be a linkage 1004 at various points between the upper and lower primary cables 116 and 120 for structural support between outer side 300 and the inner side 400.

Figure 6:
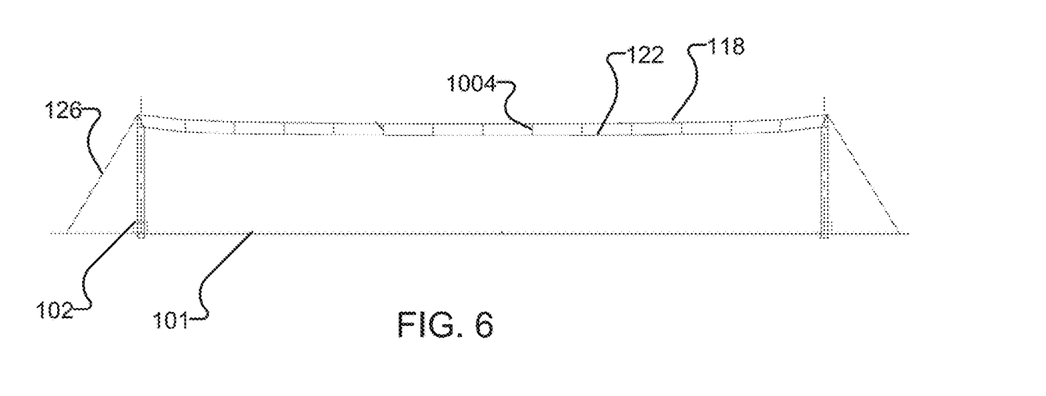
FIG. 6 is a sectional view taken along the line B-B of FIG. 1.

FIG. 6 shows a cross-sectional view of the structure 100 of FIG. 1 taken along the line B-B. FIG. 6 shows the foils that provide the sealed air volume for the structure 100. The structure 100 has spaces that contain dynamic foam insulation. Lower secondary cables 122 and upper secondary cables 118 can be connected by linkage 1004.

Figure 7:
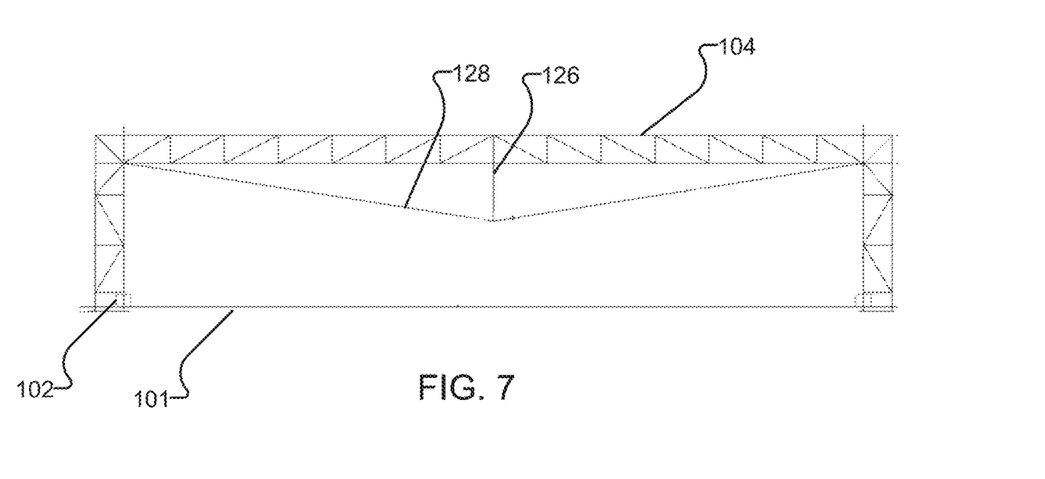
FIG. 7 is a sectional view taken along the line C-C of FIG. 1.

FIG. 7 shows a cross-sectional view of the structure 100 of FIG. 1 taken along the line C-C. FIG. 7 shows the primary singular tensile structure support tri-chord columns and truss. The structure 100 can have tie back cables 126 and cables 128 for the main support 104.

As shown in FIG. 8, upper primary cables 116 and upper secondary cables 118 form an outer cable net 800. Similarly, lower primary cables 120 and lower secondary cables 122 form an inner cable net (not shown) below the outer cable net.

Primary cables can be long span heavy gauge cables that support the secondary cables. The secondary cables can be smaller gauge perpendicular cables that thread through pockets and support the transmissive panels.

Figure 9:
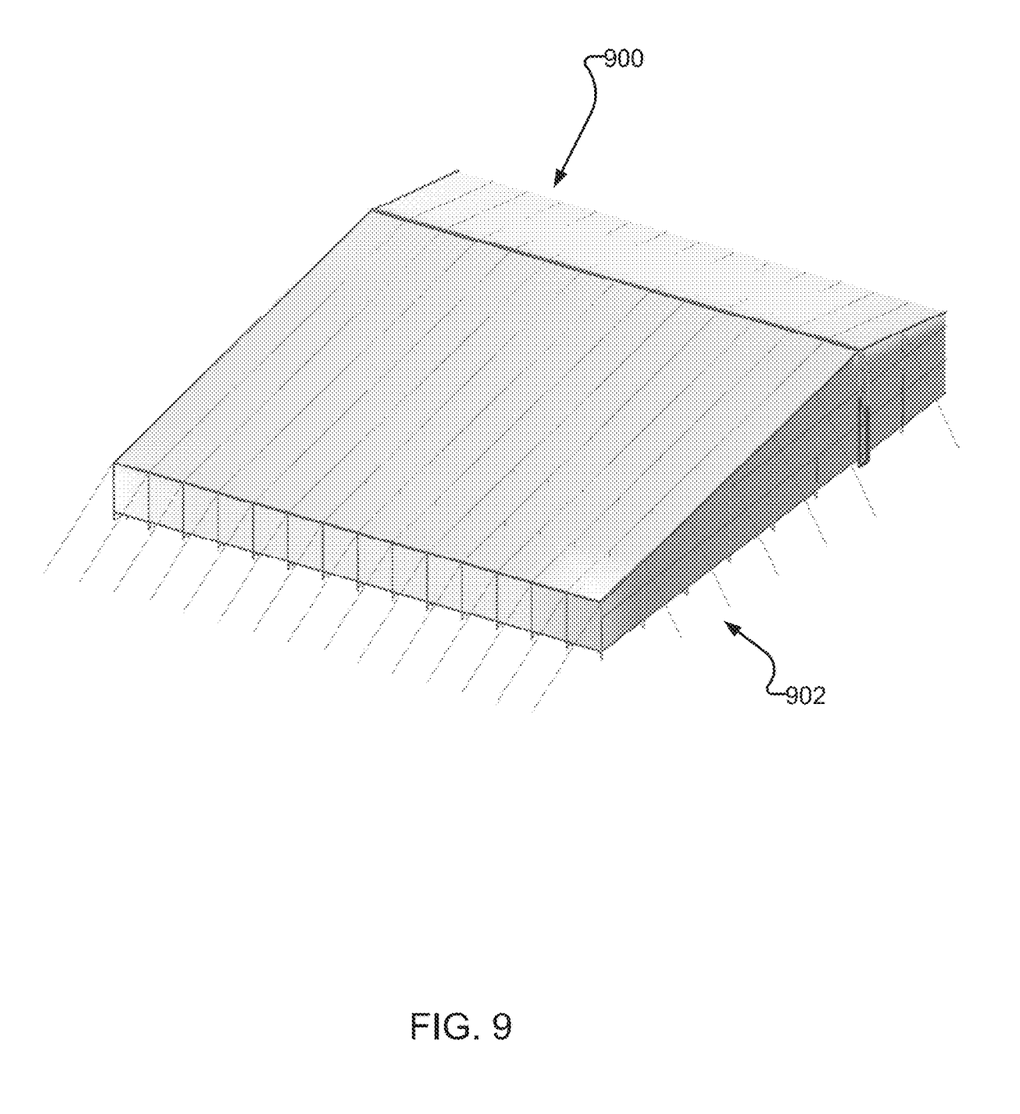
FIG. 9 shows the structure of FIG. 1 with transmissive panels attached.

As shown in FIG. 9, the outer cable net 800 provides a structure to hold transmissive panels to form an outer roof 900. Outer wall cables 302 provide a structure to hold transmissive panels along the sides 108 and the first end 110 forming an outer wall 902. Similarly, the inner cable net holds transmissive panels, forming an inner roof and inner wall cables 402 provide a structure to hold transmissive panels forming an inner wall.

The structure 100 can have parallel strips of matching transmissive panel material that can be welded to opposing sides of the outside and inside transmissive panels. This creates linear pockets within which the secondary cables are positioned, supporting the complete material structure.

Figure 10:
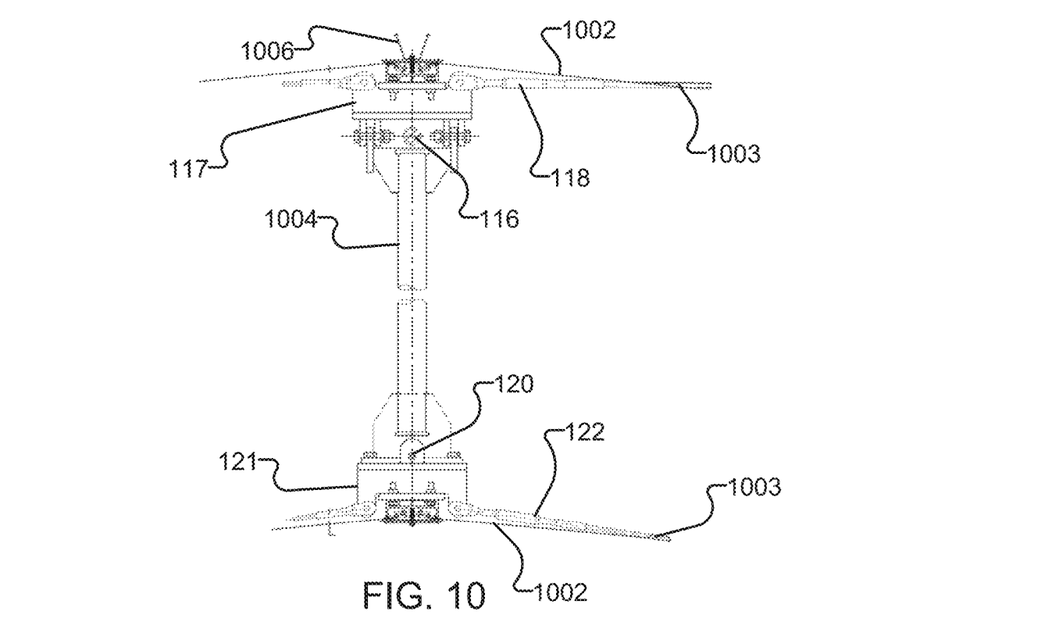
FIG. 10 shows outer and inner cables holding transmissive panels of the structure of FIG. 1.

FIG. 10 shows upper and lower primary cables 116 and 120 respectively connected to upper secondary cables 118 and lower secondary cables 122 by an upper connection assembly 117 and a lower connection assembly 121. The connections can be mechanical connections held in stasis through compressive and tensile forces. The upper secondary cables 118 and lower secondary cables 122 hold transmissive panels 1002 of the structure 100 of FIG. 1, which are also secured to the upper and lower connection assemblies 117 and 121. They can be secured by mechanical connections held in stasis through compressive and tensile forces.

In some embodiments, upper secondary cables 118 and lower secondary cables 122 may be held within pockets 1003 formed on the transmissive panels 1002. The pockets 1003 of the transmissive panels 1002 on the outer and inner roofs may, for example, be formed by attaching a strip of panel material to either side of each transmissive panel. In some embodiments, the transmissive panels 1002 of the outer and inner roofs run laterally (east-west) across the structure, parallel to the secondary cables 118 and 122. Similarly, transmissive panels 1002 on the sides 108 and first end 110 may have pockets for receiving the inner wall cables 402 and outer wall cables 302, and may run vertically, parallel to the inner and outer wall cables 302 and 402. In some embodiments, a linkage 1004 may be provided at various points between the upper and lower primary cables 116 and 120 to maintain structural integrity of the outer and inner roofs and the spacing therebetween. In some embodiments, a bird deterrent assembly 1006 may be provided above some or all of the upper primary cables 116. For the pockets 1003, parallel strips of matching material is welded to opposing sides of the outside and inside transmissive panels to create linear pockets within which the secondary cables are positioned, supporting the complete material structure.

As used herein, the term "transmissive" in relation to panels means panels which are either transparent or translucent, and which allow a high proportion of light with wavelengths in the solar spectrum to pass therethrough. In some embodiments, the transmissive panels 1002 allow UV light to pass therethrough. The transmissive panels 1002 may, for example, comprise panels of a stretchable, high-strength material. Examples of suitable materials for the transparent panels include transparent and translucent petroleum and non-petroleum based plastics and materials.

Another example material is glass. In some embodiments, the transmissive panels of the outer roof and outer walls are translucent, with a matte finish, to diffuse light, and the transmissive panels of the inner roof and inner walls are transparent. The transmissive panels can have different finishes and thickness. In some embodiments, the transmissive panels of the outer roof have a thickness of about 350μ, the transmissive panels of the outer walls have a thickness of about 300μ, and the transmissive panels of the inner roof and inner walls have a thickness of about 150μ.

Figure 11:
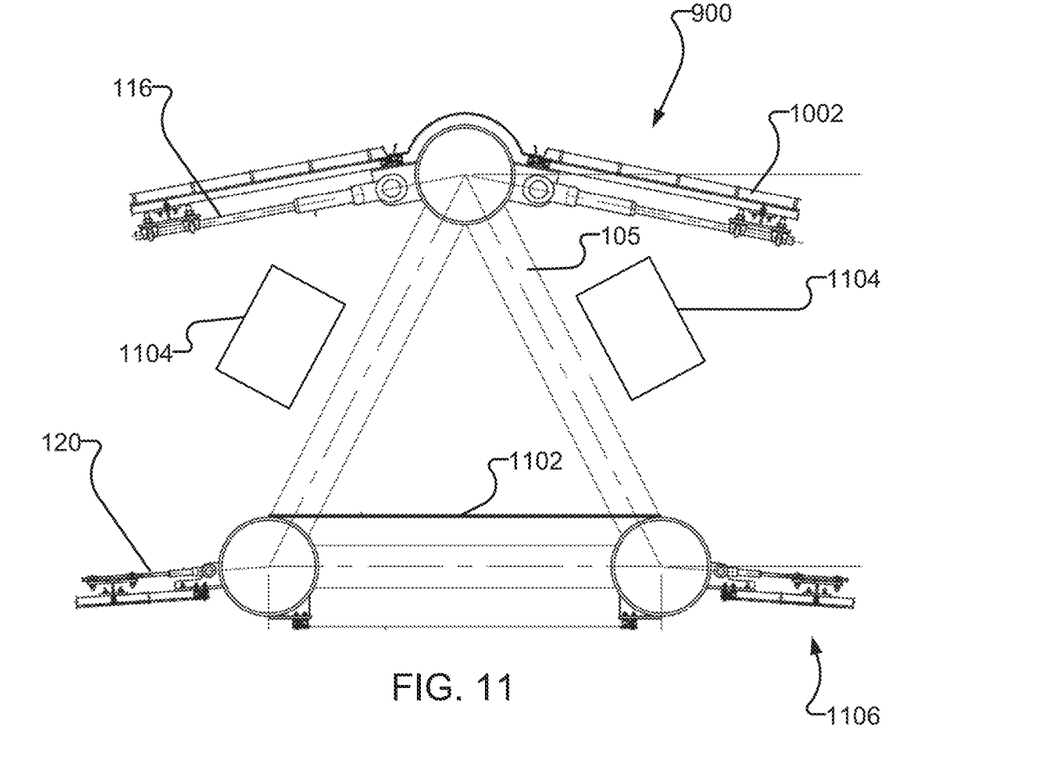
FIG. 11 is a sectional view through the horizontal member of the main support of the structure of FIG. 1.

FIG. 11 shows a cross sectional view of the horizontal member 105 of the main support 104 of the structure 100 of FIG. 1. The horizontal member 105 of the illustrated example is a tri-chord truss (as are the vertical members 103). Therefore, at the top of the structure 100 there is a space within horizontal member 105 for a platform 1102. The platform 1102 may be located lower than shown in some embodiments (for example centered on the lower chords of the horizontal member 105). The platform 1102 may be of sufficient size to permit a person to pass along it, for example for maintenance. In some embodiments, the structure comprises dynamic foam generators 1104 situated in proximity to the horizontal member 105 so that a person on platform 1102 can access them for maintenance or repair. The foam generators 1104 may be placed between the outer roof 900 and the inner roof 1106 such that the space between the outer roof 900 and inner roof 1106 fills with dynamic foam solution when the foam generators 1104 are in operation.

Foam generators 1104 generate foam from a dynamic foam solution. In some embodiments, the foam generators 1104 are operable to generate a dynamic foam that provides an insulating value of R1 per inch. Thus in an example structure with a 36" cavity between the outer skin and the inner skin, the dynamic foam may provide insulation values of up to R36. In some embodiments, the dynamic foam may also be used to providing shading and/or reduce UV transmission. In some embodiments, the solution used to generate the foam comprises approximately 99.2% water and approximately 0.8% coconut oil soap and/or other components. Once used, the dynamic foam breaks down to a liquid solution that may be captured in drains between the outer walls and inner walls along the foundation of structure 100 for later recycling.

The structure 100 has a foundation with ends and opposed lateral sides. The structure has a main support 104 with two vertical members 103 extending upwardly from the opposed lateral sides 108 of the foundation and a horizontal member 105 extending laterally across the foundation between top portions of the two vertical members 103.

The structure 100 has a plurality of vertical supports 106 extending upwardly from the foundation and spaced around a perimeter of the foundation. The structure 100 has a perimeter frame 124 connected to top portions of the vertical supports 106. The perimeter frame 124 has an outer perimeter frame 134 and an inner perimeter frame 132.

The structure 100 has an outer shell and an inner shell. The outer shell has an outer roof with an outer cable net supported by the outer perimeter frame 134 and a plurality of outer roof transmissive panels coupled to the outer cable net. The outer shell connects with welded metal connections, mechanical connections, compression, tension, and so on. The outer cable net is supported by stasis or equilibrium, compression and tension, as this is a tensile structure.

The outer shell has an outer wall on each of the opposed lateral sides and the first end. Each outer wall has outer wall cables extending vertically to the outer perimeter frame and a plurality of outer wall transmissive panels coupled to the outer wall cables. This can involve mechanical connectors, held in place through tension.

The inner shell has an inner roof with an inner cable net supported by the inner perimeter frame 132 and a plurality of inner roof transmissive panels coupled to the inner cable net. The inner shell has an inner wall on each of the opposed lateral sides and the first end. Each inner wall has inner wall cables extending vertically to the inner perimeter frame 132 and a plurality of inner wall transmissive panels coupled to the inner wall cables. The support can be provided by mechanical connections that secure metal struts between the transmissive panels, held in stasis through compressive and tensile forces.

The structure 100 can have a post extending downwardly from the horizontal member 105. The post can have a first end connected to the horizontal member 105 and a second end held under tension by cables connected to the main support 104. Hydraulic and mechanical cable tensioners can be used to tension the cables. When all cables are tensioned as engineered the cables are "stayed" by fittings or turnbuckles to fix and retain the proper setting.

In some embodiments, each of the two vertical members 103 and the horizontal member 105 of the main support 104 comprises a tri-chord truss.

In some embodiments, the vertical supports 106 are bi-chord trusses.

In some embodiments, the perimeter frame 124 is bi-chord trusses.

In some embodiments, there can be a plurality of foam generators located between the outer shell and the inner shell. In some embodiments, the foam generators are located alongside the platform.

In some embodiments, the horizontal member 105 further comprises a platform for accommodating a person between the outer shell and the inner shell.

In some embodiments, the structure can have drainage collection members at bottom portions of outer sidewalls and a first end of an outer endwall.

In some embodiments, the drainage collection members are provided in a stem wall extending upwardly from the foundation on the east and west lateral sides and the first end of the structure 100.

In some embodiments, the structure 100 can have tie-back cables, each tie-back cable having a first end attached to perimeter frame above one of the vertical supports, and a second end anchored outside the structure 100.

In some embodiments, the structure 100 can have horizontal supports 112 connected between the vertical supports 106.

The structure 100 can contain and integrate with different automated systems for growing plants. The structure 100 provides a flexible, sealed volume so that the structure 100 can accommodate different physical configurations for different automated systems. The automated systems can include production lines with conveyors and channels for plants and related matter. For example, the structure can integrate with the automated growing system as described in U.S. provisional patent application No. 62/891,562 the entire contents of which is hereby incorporated by reference.

The structure 100 can integrate with different automated systems including mechanical systems, fertigation systems, and control systems.

The structure 100 can integrate with different configurations of mechanical systems to actuate and control components of the growing systems. Mechanical systems can involve different mechanical and electrical devices such as Internet of Things (IoT) devices to collect data within the structure and actuate based on control commands. The mechanical systems interface with other facility and operational systems and practices.

The structure 100 can integrate with different configurations of fertigation systems to actuate and control fertigation components of the growing systems. Fertigation systems can include fertigation delivery lines and IoT devices that interface with other facility and operational systems and practices. The fertigation systems provide optimized fertigation nutrient mixes.

The structure 100 can integrate with different configurations of control systems and exchange of control commands for different components of the growing systems, including the mechanical systems and fertigation systems. Control systems can interface and integrate through IoT devices, components of the structure, operational systems, and practices.

The structure 100 supports automated grow systems, which create the environmental (micro-climate) conditions and horticultural environment components that optimize the growing environment. The structure 100 supports the facility HVAC systems, which create the environmental (micro-climate) conditions and positive air pressure that optimized the growing environment.

The structure can help implement standard operational practices (SOPs). The SOPs can involve program code or instructions to direct or control complex operations within the structure 100. The SOPs can provide performance criteria that together with the structure can generate a micro-climate for different growing systems. SOPs can achieve efficiency, quality output and uniformity of performance, while reducing miscommunication and compliance failures. The SOPs can interface and integrate through IoT devices, operational systems, and practices.

The structure 100 can be used for specialized methods of cultivation.

The structure 100 can be used for different plants. The structure 100, automated growing systems, and SOP are configured for different agriculture crops, and nutraceutical or pharmaceutical plants.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus, if one embodiment comprises elements A, B and C, and a second embodiment comprises elements B and D, then the inventive subject matter is also considered to include other remaining combinations of A, B, C or D, even if not explicitly disclosed.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A structure providing an air tight building envelope for growing plants, the structure comprising:
    a foundation having a first end, a second end, and opposed lateral sides;
    a main support comprising two vertical members extending upwardly from the opposed lateral sides of the foundation and a horizontal member extending laterally across the foundation between top portions of the two vertical members;
    a plurality of vertical supports extending upwardly from the foundation and spaced around a perimeter of the foundation;
    a perimeter frame connected to top portions of the vertical supports, the perimeter frame having an outer perimeter frame and an inner perimeter frame;
    an outer shell comprising:
        an outer roof comprising an outer cable net supported by the outer perimeter frame and a plurality of outer roof transmissive panels coupled to the outer cable net, and
        an outer wall on each of the opposed lateral sides and the first end, each outer wall comprising outer wall cables extending vertically to the outer perimeter frame and a plurality of outer wall transmissive panels coupled to the outer wall cables;
    an inner shell comprising:
        an inner roof comprising an inner cable net supported by the inner perimeter frame and a plurality of inner roof transmissive panels coupled to the inner cable net,
        an inner wall on each of the opposed lateral sides and the first end, each inner wall comprising inner wall cables extending vertically to the inner perimeter frame and a plurality of inner wall transmissive panels coupled to the inner wall cables;
    a plurality of foam generators located between the outer shell and the inner shell; and
    one or more panels that close to generate an air tight building envelope and create a sealed air volume or barrier for the structure.

2. The structure of claim 1 further comprising:
    a post extending downwardly from the horizontal member, the post having a first end connected to the horizontal member and a second end held under tension by cables connected to the main support.

3. The structure of claim 1, wherein each of the two vertical members and the horizontal member of the main support comprises a tri-chord truss.

4. The structure of claim 1, wherein the vertical supports comprise bi-chord trusses.

5. The structure claim 1, wherein the perimeter frame comprises bi-chord trusses.

6. The structure of claim 1, wherein the horizontal member further comprises a platform between the outer shell and the inner shell.

7. The structure of claim 1, wherein the foam generators are located alongside the platform.

8. The structure of claim 1, further comprising drainage collection members at bottom portions of outer sidewalls and a first end of an outer endwall.

9. The structure of claim 8, wherein the drainage collection members are provided in a stem wall extending upwardly from the foundation on the lateral sides and the first end of the structure.

10. The structure of claim 1, further comprising plurality of tie-back cables, each tie-back cable having a first end attached to perimeter frame above one of the vertical supports, and a second end anchored outside the structure.

11. The structure of claim 1, further comprising a plurality of horizontal supports connected between the vertical supports.

12. The structure of claim 1, wherein the structure comprises an automated growing system with conveyors and channels for plants.

13. The structure of claim 12, further comprising supports for control system components of the automated growing system.

14. The structure of claim 12, further comprising connectors for mechanical system components of the automated growing system.

15. The structure of claim 12, further comprising supports for fertigation system components of the automated growing system.

16. The structure of claim 12 further comprising control system components to create environmental conditions within the sealed air volume or barrier for the structure and horticultural environment components to optimize a growing environment for the structure.

17. A structure providing an air tight building envelope for growing plants, the structure comprising:
    a foundation having a first end, a second end, and opposed lateral sides;
    a main support comprising two vertical members extending upwardly from the opposed lateral sides of the foundation and a horizontal member extending laterally across the foundation between top portions of the two vertical members;
    a plurality of vertical supports extending upwardly from the foundation;
    a perimeter frame connected to top portions of the vertical supports, the perimeter frame having an outer perimeter frame and an inner perimeter frame;
    an outer shell comprising:
        an outer roof comprising an outer cable net supported by the outer perimeter frame and a plurality of outer roof transmissive panels coupled to the outer cable net, and
        an outer wall on each of the opposed lateral sides and the first end, each outer wall comprising outer wall cables extending vertically to the outer perimeter frame and a plurality of outer wall transmissive panels coupled to the outer wall cables;

an inner shell comprising:
an inner roof comprising an inner cable net supported by the inner perimeter frame and a plurality of inner roof transmissive panels coupled to the inner cable net, and an inner wall on each of the opposed lateral sides and the first end, each inner wall comprising inner wall cables extending vertically to the inner perimeter frame and a plurality of inner wall transmissive panels coupled to the inner wall cables;

a plurality of foam generators located between the outer shell and the inner shell; and one or more panels that close to generate an air tight building envelope and create a sealed air volume or barrier for the structure.

18. The structure of claim 17 further comprising:
a post extending downwardly from the horizontal member, the post having a first end connected to the horizontal member and a second end held under tension by cables connected to the main support.

19. The structure of claim 17, wherein each of the two vertical members and the horizontal member of the main support comprises a tri-chord truss.

20. The structure of claim 17, wherein the vertical supports comprise bi-chord trusses.

21. The structure of claim 17, wherein the perimeter frame comprises bi-chord trusses.

\* \* \* \* \*